United States Patent

[11] 3,590,144

[72] Inventor Walter Bruch
Hannover, Germany
[21] Appl. No. 769,307
[22] Filed Oct. 21, 1968
[45] Patented June 29, 1971
[73] Assignee Telefunken Patentverwertungsgesellschaft m.b.H.
Ulm Danube, Germany
[32] Priority Oct. 21, 1967
[33] Germany
[31] P 15 37 491.1

[54] CHROMINANCE SUBCARRIER CONTROL IN COLOR TELEVISION TRANSMISSION
4 Claims, 3 Drawing Figs.

[52] U.S. Cl. .......... 178/5.4, 178/69.5, 328/187
[51] Int. Cl. .......... H04n 9/44
[50] Field of Search .......... 178/5.4, 5.4 P, 5.4 SY, 69.5 CB, 69.5 G; 328/187

[56] References Cited
UNITED STATES PATENTS

| | | | |
|---|---|---|---|
| 2,831,917 | 4/1958 | Jacobs | 178/5.4 P |
| 3,073,894 | 1/1963 | De France | 178/5.4 P |
| 3,492,417 | 1/1970 | Scholz | 178/5.4 P |

*Primary Examiner*—Robert L. Griffin
*Assistant Examiner*—Richard P. Lange
*Attorney*—Spencer & Kaye

ABSTRACT: A circuit for imparting to the chrominance subcarrier to a television transmitter a desired frequency and phase relationship with the horizontal synchronizing pulses of the video information signal, which circuit includes signal-processing means for deriving from the subcarrier a pulse signal which is at the horizontal synchronizing frequency and which bears the desired frequency and phase relation to the subcarrier, a phase comparator for comparing this pulse signal with the horizontal synchronizing pulses of the information signal, and control means connected between the phase comparator and the chrominance subcarrier generator for adjusting the subcarrier generator in such a manner as to bring the pulse signal into phase coincidence with the synchronizing pulses of the information signal.

INVENTOR
Walter Bruch

BY Spencer & Kaye

ATTORNEYS

CHROMINANCE SUBCARRIER CONTROL IN COLOR TELEVISION TRANSMISSION

BACKGROUND OF THE INVENTION

It is known in the color television art to cause the chrominance subcarrier to have an unvarying frequency and phase relationship with the horizontal synchronizing pulses in order to reduce the appearance of the chrominance subcarrier in the reproduced picture as much as possible. For example, in the PAL (Phase-Alternating Line) color television system the chrominance subcarrier is altered by one-half the picture field frequency with respect to a frequency which is shifted by one-quarter of a picture line with respect to the horizontal line-scanning frequency, i.e. it is shifted by one-quarter of the line-scanning frequency with respect to a whole-number multiple of the line-scanning frequency, as described in German Pat. No. 1,179,986.

It is known to achieve this frequency and phase relationship, as described in the publication Telefunken-Zeitung, Issue ½, 1963, at page 95, by first converting the chrominance subcarrier produced in a quartz master oscillator, by mixing it with an oscillation at half the field frequency, into a pure one-quarter line-shifted signal, and by then converting this signal, by means of frequency division, into an oscillation at twice the line-scanning frequency $2f_H$ from which the half-field frequency and the line-scanning frequency can be derived by further frequency division. In such circuits the chrominance subcarrier is first produced in a master oscillator, for example a quartz oscillator, and a signal at the line-scanning frequency is derived therefrom by frequency conversion according to a particular shift pattern.

In a broadcasting standard converter it is presently often necessary to initially produce a chrominance subcarrier which is to be frequency and phase-coupled with the line-scanning frequency component of an incoming signal. The known circuits can not be employed for such a purpose without modifications because the line-scanning frequency is not to be derived from the chrominance subcarrier frequency, but rather the chrominance subcarrier frequency from the line-scanning frequency. Multiplexer circuits which, by repeated multiplexing, derive the chrominance subcarrier frequency from the line-scanning frequency are relatively complicated and difficult to build.

SUMMARY OF THE INVENTION

It is a primary object of the present invention to overcome these drawbacks and difficulties.

Another object of the invention is to effect an improved control of the chrominance subcarrier.

Yet another object of the invention is to achieve the desired frequency and phase relationship between the horizontal synchronizing pulses of the video information signal and an independently generated chrominance subcarrier.

These and other objects according to the invention are achieved by the provision, in a color television signal transmitter having a chrominance subcarrier generator, of an improved circuit for controlling the chrominance subcarrier to achieve a desired frequency and phase relation with the horizontal synchronizing pulses of the video information signal. The circuit according to the invention essentially includes generator means connected to receive the subcarrier and to derive therefrom a pulse signal at the horizontal synchronizing frequency and having the desired frequency and phase relation with the subcarrier, phase comparator means for comparing the pulse signal with the horizontal synchronizing pulses of the information signal, and control means connected to the comparator means for adjusting the subcarrier generator so as to bring the pulse signal and the synchronizing pulses of the information signal into phase coincidence.

The present invention results in a relatively simple circuit arrangement and assures a fault-free frequency and phase coupling between the frequency of the newly created chrominance subcarrier and the line-scanning frequency of the incoming signal, for example in a broadcasting standard converter.

DESCRIPTION OF THE PREFERRED EMBODIMENTS

Figures 1, 2, 3:
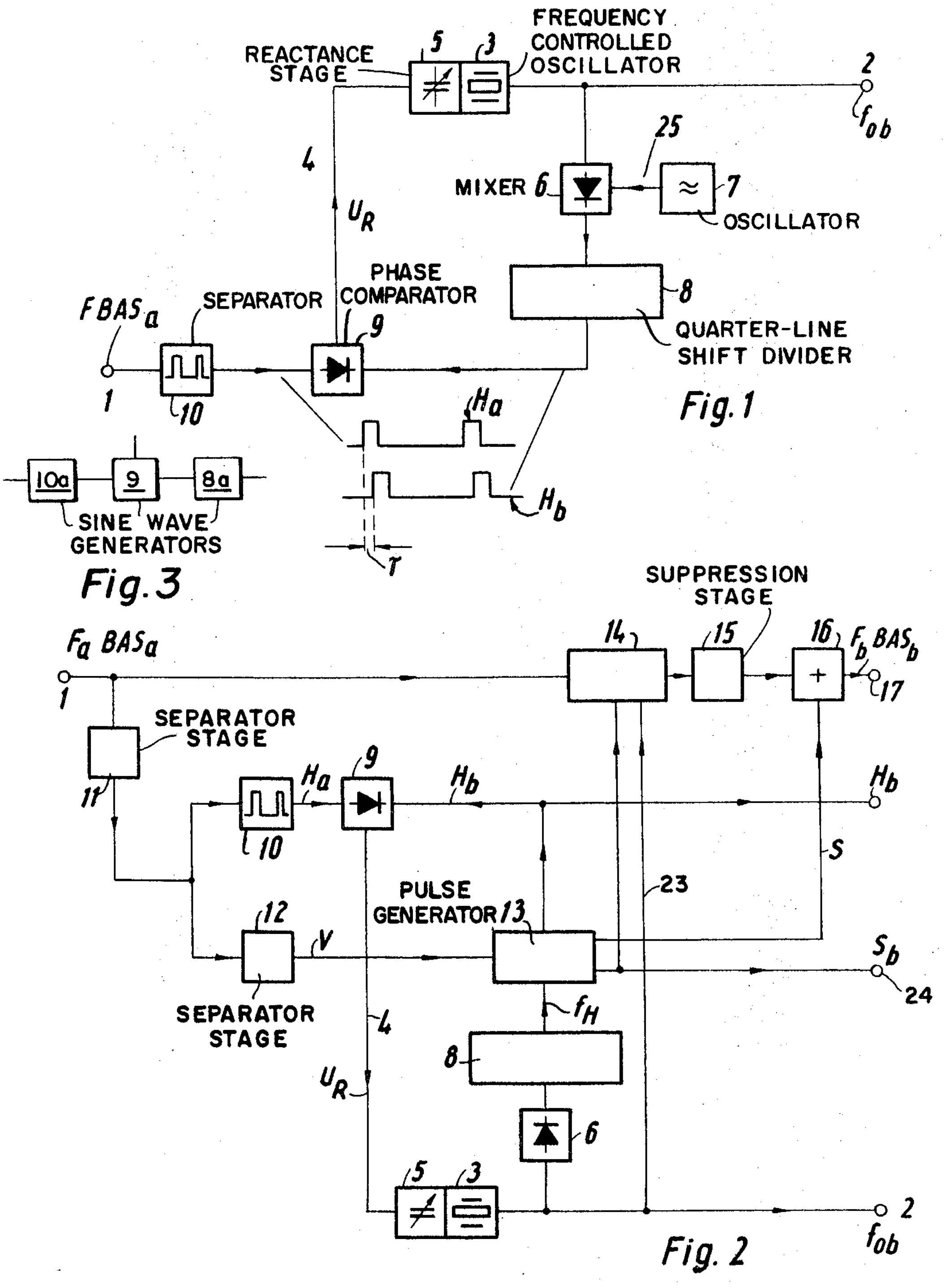
FIG. 1 is a circuit diagram of a preferred embodiment of the invention.
FIG. 2 is a circuit diagram showing the connection of a circuit according to the present invention in a standard converter.
FIG. 3 is a detail view of a portion of a modified version of the circuit of FIG. 1.

In FIG. 1, an incoming FBAS video signal containing picture information is applied to terminal 1 and a newly created chrominance subcarrier is fed out to terminal 2, which chrominance subcarrier is intended to be coupled with the horizontal sync frequency of the signal applied to terminal 1 according to the known quarter-line shift relationship. The PAL chrominance subcarrier having a frequency of $f_{ob}$ which is shifted by 25 Hz. with respect to a quarter-line shift frequency, is generated in an oscillator 3 whose frequency is controllable by means of a control voltage $U_R$ applied via a line 4 and a reactance stage 5. In transmitters operating according to the NTSC-system the frequency $f_{ob}$ would be shifted by 30 Hz. with respect to any offset to the line frequency.

According to the present invention, the 25 Hz. difference in frequency $f_{ob}$ is first removed in a mixing stage 6 by mixing the output from oscillator 3 with a 25 Hz. oscillation from an oscillator 7 originating, for example, from a pulse generator or from the system. In a ¼-line shift divider 8, which consists, for example, of a known arrangement of a plurality of dividers or mixing stages, the quarter-line-shifted frequency is converted to a line-scanning frequency voltage $H_b$ which, due to the effect of stages 6 and 8, has the desired frequency and phase relation with the frequency $f_{ob}$ of the chrominance subcarrier varied according to the PAL shift. This voltage $H_b$ is fed to a phase comparison stage 9. Between the frequencies $f_{ob}$ and $H_b$ there is the following relationship:

$$f_{ob}=(n\pm 1/4)\cdot H_b\pm 25\text{ Hz.}$$

wherein $n$ is an whole number.

A line-scanning frequency voltage $H_a$ which is generated in a separator stage 10 from the signal arriving at terminal 1, is also fed to the phase comparison stage 9. The phase comparison stage 9 furnishes at line 4 a control voltage $U_R$ whose amplitude is dependent on the phase difference $\tau$ between the voltages $H_a$ and $H_b$. This control voltage influences, via the reactance stage 5, the frequency of oscillator 3 in such a manner that the frequency of voltage $H_b$ also changes in a direction to reduce the phase difference $\tau$ to zero. All of the elements shown in FIG. 1 are well known in the art.

The control circuit according to the present invention thus assures that the voltage $H_a$, which represents the line-scanning frequency of the signal arriving at terminal 1, and the voltage $H_b$ have the same frequency and phase. Since, on the other hand, the frequency relationship between the chrominance subcarrier $f_{ob}$ at terminal 2 and the voltage $H_b$ is determined by stages 6 and 8, it results that the chrominance subcarrier $f_{ob}$ also exhibits the desired frequency and phase relation with the line-scanning frequency of the signal arriving at terminal 1.

The voltages $H_a$ and $H_b$ can also be converted into two line-frequency sinusoidal voltages, as shown in FIG. 3, by filtering out their fundamental component, or by actuating sine wave generator circuits 8a and 10a tuned to the fundamental component, and can be fed in this form to the phase comparison stage 9.

FIG. 2 shows the use of a circuit according to the present invention in a signal standard converter which converts a signal whose form is in accordance with some standard *a* to a signal according to a standard *b*. For example the converter may convert a PAL color television signal into a SECAM color television signal or vice versa.

From a video signal delivered at terminal 1, the horizontal synchronizing pulses are separated in a separator stage 11 and these pulses are used to produce, in a separator stage 10, line-scanning frequency pulses $H_a$ and, in a separator stage 12, vertical scanning frequency, or vertical synchronizing, pulses V. From the chrominance subcarrier generated in oscillator 3, a voltage at the line-scanning frequency is derived, again through the mixing stage 6 and the divider 8. This voltage, at the horizontal sync frequency $f_H$, controls a pulse generator 13 which furnishes sync pulses for standard *b* at terminal 24 and horizontal sync pulses to one input of the phase comparison stage 9. The mixing stage 6 is likewise fed by an oscillator as shown at 7 in FIG. 1. S is the synchronizing signal for the new signal $F_b$ $BAS_b$, $S_b$ are synchronizing pulses for any other purposes within the transcoder and $H_b$ is a line-frequency signal of the new signal $F_b$ $BAS_B$.

The phase comparison stage 9 again furnishes to line 4 a control voltage $U_R$ which so controls the frequency of oscillator 3, via the reactance stage 5, that the voltages $H_a$ and $H_b$ have the same frequency and phase and thus the frequency of the chrominance subcarrier $f_{ob}$ appearing at terminal 2 is frequency and phase coupled, according to the desired shift, with the line-scanning frequency of the signal arriving at terminal 1.

The chrominance subcarrier produced in oscillator 3 is also fed, via a line 23, to a transcoder 14 disposed in the path of the $F_aBAS_a$ color video signal and here effects transcoding of the chrominance subcarrier from $F_a$ to $F_b$, for example by demodulation and a new modulation. In a suppression stage 15 the sync pulses are removed from the FBAS video signal. In an adder stage 16 the synchronous pulses S generated in pulse generator 13 and corresponding to the new standard *b* are added to the FBAS color video signal. At the output terminal 17 there is then an FBAS color video signal according to the new standard *b*.

It will be understood that the above description of the present invention is susceptible to various modifications, changes and adaptations.

I claim:

1. In a color television signal transmitter having a chrominance subcarrier generator, a circuit for controlling the chrominance subcarrier generated in the chrominance subcarrier generator to achieve a desired frequency and phase relation with the horizontal synchronizing pulses of the video information signal, said circuit comprising, in combination: generating means connected to the subcarrier generator to receive the chrominance subcarrier for deriving therefrom a pulse signal at the horizontal synchronizing pulse frequency and having such desired frequency and phase relation with the chrominance subcarrier; phase comparator means having one input connected to said generating means and another input connected to receive the horizontal synchronizing pulses of the video information signal for comparing the pulse signal produced by said generating means with the horizontal synchronizing pulses of the video information signal; and control means connected between said comparator means and the subcarrier generator for adjusting the subcarrier generator so as to bring the pulse signal and the synchronizing pulses of the video information signal into phase coincidence.

2. An arrangement as defined in claim 1, further comprising means for converting the pulse signal and the horizontal synchronizing pulses of the information signal into sinusoidal waves, each having a frequency equal to the line-scanning frequency, said sinusoidal waves being fed to said phase comparator.

3. An arrangement as defined in claim 1 for use in a standard converter for converting the television signal from a first standard to a second standard, wherein the chrominance subcarrier is produced in conformance with the second standard and is given a desired frequency and phase relation with the horizontal synchronizing pulses of the signal according to the first standard.

4. An arrangement as defined in claim 1 wherein the frequency and phase relation between the synchronizing pulses and the chrominance subcarrier is in accordance with the PAL quarter-line shift.